United States Patent [19]

Young

[11] 4,362,033

[45] Dec. 7, 1982

[54] AUTOMATIC MIXING AND CLOTH BLEACHING CONTROL

[75] Inventor: Charles W. Young, Dorval, Canada

[73] Assignee: Dominion Textile, Inc., Montreal, Canada

[21] Appl. No.: 149,129

[22] Filed: May 8, 1980

[51] Int. Cl.³ .................. D06B 23/26; B01F 15/02
[52] U.S. Cl. ................................ 68/207; 222/56; 222/64; 366/142; 366/152; 366/153; 366/161; 366/162
[58] Field of Search ............... 68/207; 366/134, 142, 366/152, 153, 160, 161, 162, 192; 222/14, 56, 64; 137/389, 391, 411; 364/479; 340/619, 621; 73/290 V

[56] References Cited

U.S. PATENT DOCUMENTS

| | | |
|---|---|---|
| 2,630,002 | 3/1953 | Converse et al. ............... 68/207 |
| 2,943,296 | 6/1960 | Fryklund . |
| 2,960,678 | 11/1960 | Beard et al. ............... 73/290 V X |
| 3,223,964 | 12/1965 | Stadlin . |
| 3,347,416 | 10/1967 | Hamilton ............... 222/56 |
| 3,400,467 | 9/1968 | Drace . |
| 3,470,718 | 10/1969 | Scourtas . |
| 3,705,598 | 12/1972 | Ray . |
| 3,804,297 | 4/1974 | Jurjans . |
| 3,826,113 | 7/1974 | Noraas et al. . |
| 3,826,904 | 7/1974 | Leonard et al. . |
| 3,843,099 | 10/1974 | Duncan ............... 366/153 X |
| 3,901,724 | 8/1975 | White . |
| 3,948,490 | 4/1976 | Troope ............... 366/160 X |
| 3,957,253 | 5/1976 | Barton et al. ............... 366/132 |
| 4,120,656 | 10/1978 | Henningsen ............... 137/391 X |

FOREIGN PATENT DOCUMENTS

| | | |
|---|---|---|
| 525551 | 5/1956 | Canada . |
| 527985 | 7/1956 | Canada . |
| 634183 | 1/1962 | Canada . |
| 647886 | 9/1962 | Canada . |
| 696159 | 10/1964 | Canada . |
| 760752 | 6/1967 | Canada . |
| 764668 | 8/1967 | Canada . |
| 770357 | 10/1967 | Canada . |
| 836758 | 3/1970 | Canada . |
| 908794 | 8/1972 | Canada . |

Primary Examiner—Philip R. Coe
Attorney, Agent, or Firm—Wenderoth, Lind & Ponack

[57] ABSTRACT

An automatic chemical mixing system using a single level sensor, preferably an ultrasonic sensor, for monitoring the contents of a mixing tank. The level sensor provides an analog signal to a controller indicative of the level of liquid in the tank. Supply pipes from several sources of different chemicals lead to the tank through respective controllable valves. The required percentage of each chemical can be entered manually into the controller and each valve is opened in turn by the controller until the various percentages are reached. Provision is also made for adding small quantities of a further chemical which is supplied by a metering pump. The controller ensures that this is done after the other chemicals have been added. A mixer, also under control of the controller, starts running when all the chemicals have been added and stops when a predetermined low level is reached. A supply line from the tank to a process stage includes a controllable valve which is opened by the controller at the end of a fill cycle and closed when the tank is empty. The system incorporates alarms indicating "slow fill" and other problems. The mixture obtained is of repeatable accuracy and can be used as feedstock to a cloth processing stage in which chemicals are fed to a saturator at a known percentage of the weight of the cloth being processed per minute.

28 Claims, 9 Drawing Figures

AUTOMATED BATCH PREPARE
SYSTEM CONCERT SK-1

AUTOMATIC MIXING AND CLOTH BLEACHING CONTROL

BACKGROUND OF THE INVENTION

This invention relates to the automatic mixing of chemicals and the automatic feeding of the resultant mix to a cloth saturator.

Various chemical mixing systems have been proposed in the past but most of these have either been very rudimentary in which case the mix quality is not very accurately controlled or overly complex with the attendant initial and maintenance costs.

With particular regard to the feeding of chemicals to cloth saturators during the continuous bleaching of cloth, the most common way of ensuring correct strength of the bath has been by taking samples at intervals and adjusting by manual means the flows of a bleach chemical and stabilizer mix fed to the saturator. This procedure is subject to human error.

SUMMARY OF THE INVENTION

It is an object of the present invention to provide a novel chemical mixing system which provides accurate results, is easily maintained and is flexible.

It is another object of the invention to provide a novel saturator control apparatus which automatically controls the feed of chemicals to the saturator directly in proportion to the weight of cloth being processed per unit of time.

In accomplishing the first of these objects, there is provided apparatus for providing a mix of two or more liquids in predetermined volumetric proportions comprising a mixing tank, supply lines leading to the mixing tank from respective sources of the two or more liquids, valve means on each supply line for controlling the flow of the respective liquid, a single level sensor, preferably an ultrasonic level sensor positioned above the tank, for monitoring the level of liquid in the tank, control means supplied by electrical signals from the sensor which signals are indicative of the level of liquid in the tank, means in the control means for setting two or more desired levels corresponding respectively to the desired volumetric proportions and for comparing the level monitored by the ultrasonic sensor with the set levels to obtain control signals and means responsive to the control signals to open and close each valve in sequence to obtain the desired mix.

As a further feature of the prepared embodiment small quantities of a further chemical can be fed to the mixing tank from a drum using a positive displacement pump.

The mix obtained from the above apparatus can be used in further apparatus according to the invention for controlling the flow of at least one chemical to a cloth saturator bath through which cloth to be processed is continuously passed comprising means for deriving signals representative of the speed of the cloth, means for weighting these signals according to the density of the cloth whereby signals corresponding to the weight of cloth per minute are obtained, means responsive to the last mentioned signals to pump into the saturator bath a quantity of said at least one chemical whereby the quantity of said at least one chemical pumped to the saturator bath corresponds to the measured weight of cloth per minute.

DESCRIPTION OF THE PREFERRED EMBODIMENT

Figure 1:
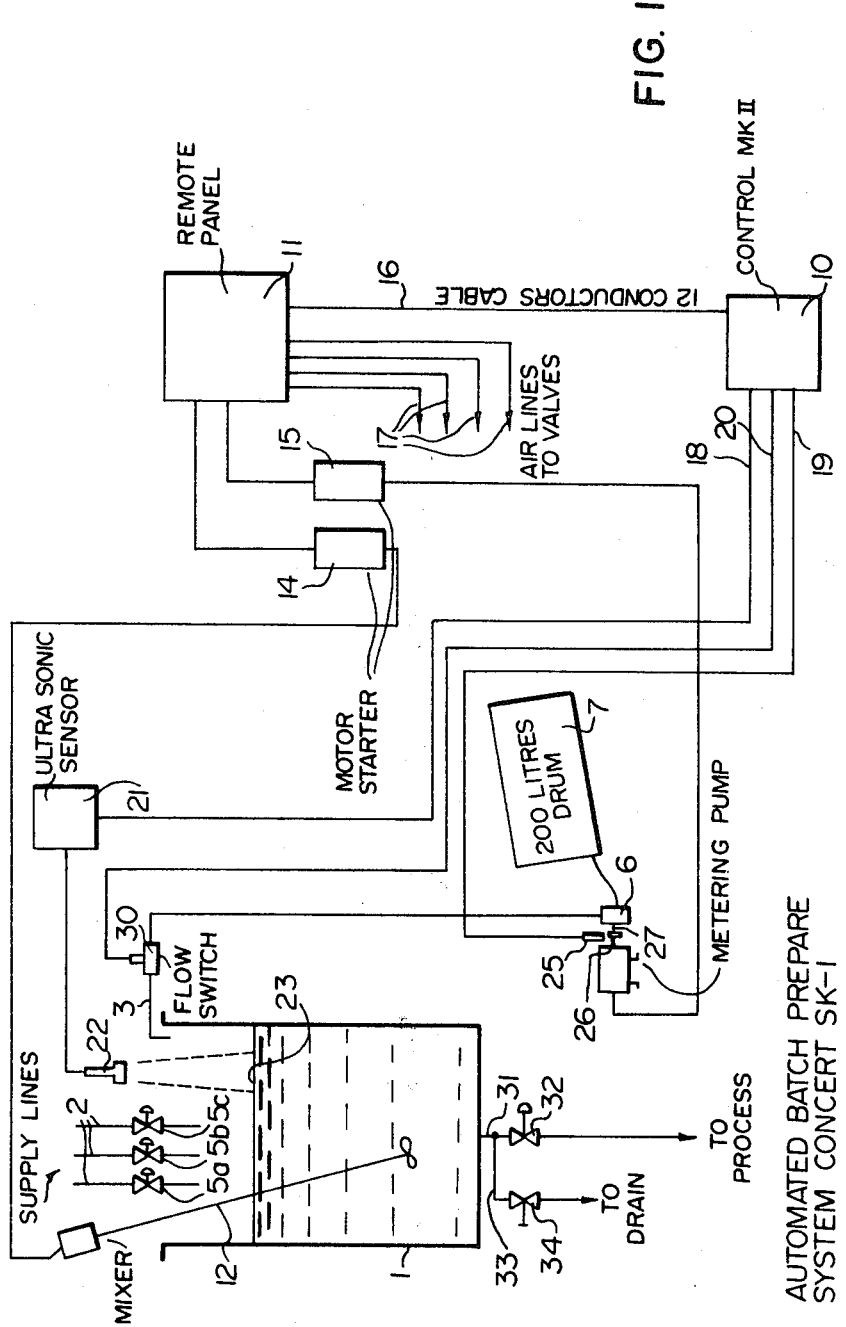
FIG. 1 is a diagrammatic view of an automatic chemical mixing system according to the invention.

Referring now to FIG. 1, a mixing tank 1 is provided for the mixing of several chemicals. For the preparation of a stabilizing solution used in bleaching cloth the chemicals typically would be sodium hydroxide, sodium silicate, water and Kalex Penta. Three supply lines 2 are used, respectively, to supply the sodium hydroxide, sodium silicate and water, a fourth supply line 3 being provided for the supply of Kalex Penta to the tank 1.

Each supply line 2 is connected to a source (not shown) of the respective chemical and is provided with a valve 5 for controlling the supply of the respective chemical to the tank 1. Valve 5a is connected to a water source, valve 5b to a source of sodium silicate and valve 5c to a source of sodium hydroxide. The supply line 3 is connected to a metering pump 6 which is connected to a 200 liter drum 7 of Kalex Penta.

The metering pump 6 and valves 5 are under control of an automatic control system which includes a controller 10 and a remote panel 11 located beside the tank 1. The function of the panel 11 is to operate the valves 5 when instructed by the controller 10 which monitors the mixing process as explained below.

Projecting into tank 1 is a mixer or stirrer 12 and this is connected electrically to a mixer starter 14 which is in turn electrically connected to the remote panel 11. Similarly, the metering pump 6 is connected electrically to a starter 15 which is connected electrically to the remote panel 11. Both starters are operated by the remote panel under command from the controller 10.

Remote panel 11 is interconnected to controller 10 by a 12 conductor control cable 16 and four air lines 17 are connected between panel 11 and the various valves including valves 5a, 5b and 5c. When a respective solenoid (not shown) is activated under control of controller 10 compressed air is fed to the appropriate one of air lines 17 to activate the associated valve.

There are three main electrical inputs to controller 10, those being shown as lines 18, 19 and 20. Line 18 is connected to an ultrasonic sensor 21 which incorporates a transducer 22 positioned above the tank 1. The ultrasonic sensor 21 is a commercially available device which is arranged so that the transducer continuously emits ultrasonic pulses which impinge on the surface 23 of the liquid in tank 1 and are reflected back to the transducer where they are reconverted to electrical signals. The time delay between transmitted pulses and received pulses is used as the basis for determining the distance the pulses have travelled and hence the level of surface 23. The output signal from level sensor 21 is an electrical analog voltage the magnitude of which is proportional to the level.

Line 19 is connected to an electromagnetic transducer 25 which supplies electrical signals in response to a magnetic portion 26 on the rotating shaft 27 of the metering pump 6. Thus, the output of transducer 25 is indicative of the number of rotations of the shaft 27 which, assuming normal operation and adequate supply of Kalex Penta in the drum 7, is indicative of the quantity of Kalex Penta pumped through line 3.

Line 20 is connected to a transducer 30 which senses the flow of Kalex Penta in line 30 and derives an electrical signal when flow stops.

An output line 31 from mixing tank 1 is provided with a process or valve 32 which is also operated by a respective air line 17 under solenoid control through remote panel 11 on instructions emanating from controller 10. The line 31 delivers mix from the tank 1 to a process which requires the mix. A branch line 33 which is provided with a manually operable valve 34 is connected to a drain and would be used only for flushing out the tank during routine cleaning.

The system operates as follows. With the controller set as described below for delivery of required quantities of the four chemicals to the mixing tank 1, the controller is switched to its "run" position. The supply valve 32 is open and the tank 1 is feeding to the process. Valves 5 are all closed and metering pump 6 is stationary but mixer 12 is running.

When level 23 drops below the bottom of mixer 12 the controller 10 causes mixer 12 to stop and when the tank becomes empty or when a predetermined level, referred to as zero level, is reached indicating a predetermined low (nearly empty) condition, controller 10 closes supply valve 32 as the first step in a tank fill cycle.

Subsequently the valve 5a which is connected to the water source is opened until surface 23 reaches a predetermined level, referred to as level 1, as sensed by transducer 22 at which point water valve 5a is closed and valve 5b is opened to supply silicate to the tank.

Sodium silicate flows into the tank until surface 23 reaches another predetermined level, level 2, as sensed by transducer 22 at which point the silicate valve 5b closes and the caustic soda valve 5c opens.

Valve 5c remains open until a further predetermined level, level 3, is reached and, then pump 6 is started to meter out a predetermined number of liters, as measured by transducer 25, of Kalex Penta into the tank 1.

When pump 6 stops mixer 12 starts and runs for a predetermined interval, e.g. 1½ minutes, before supply valve 32 is again opened to start another discharge cycle, the mixer continuing to run until the surface 23 again drops below the mixer.

When the surface 23 again reaches the zero level, the fill cycle starts again.

If during the above sequence, flow sensor 30 does not detect flow (or if it detects reduced flow) in line 3 at the appropriate time, i.e. after level 3 has been reached, an alarm, which may be a flashing light (not shown) is triggered which indicates that the drum is empty or nearly so or that the pump is not working and that corrective action is necessary.

Another alarm, which will be described in more detail below, is actuated when the total fill cycle takes too long, which indicates that there is an insufficient supply of water, sodium silicate or sodium hydroxide.

Figure 2:
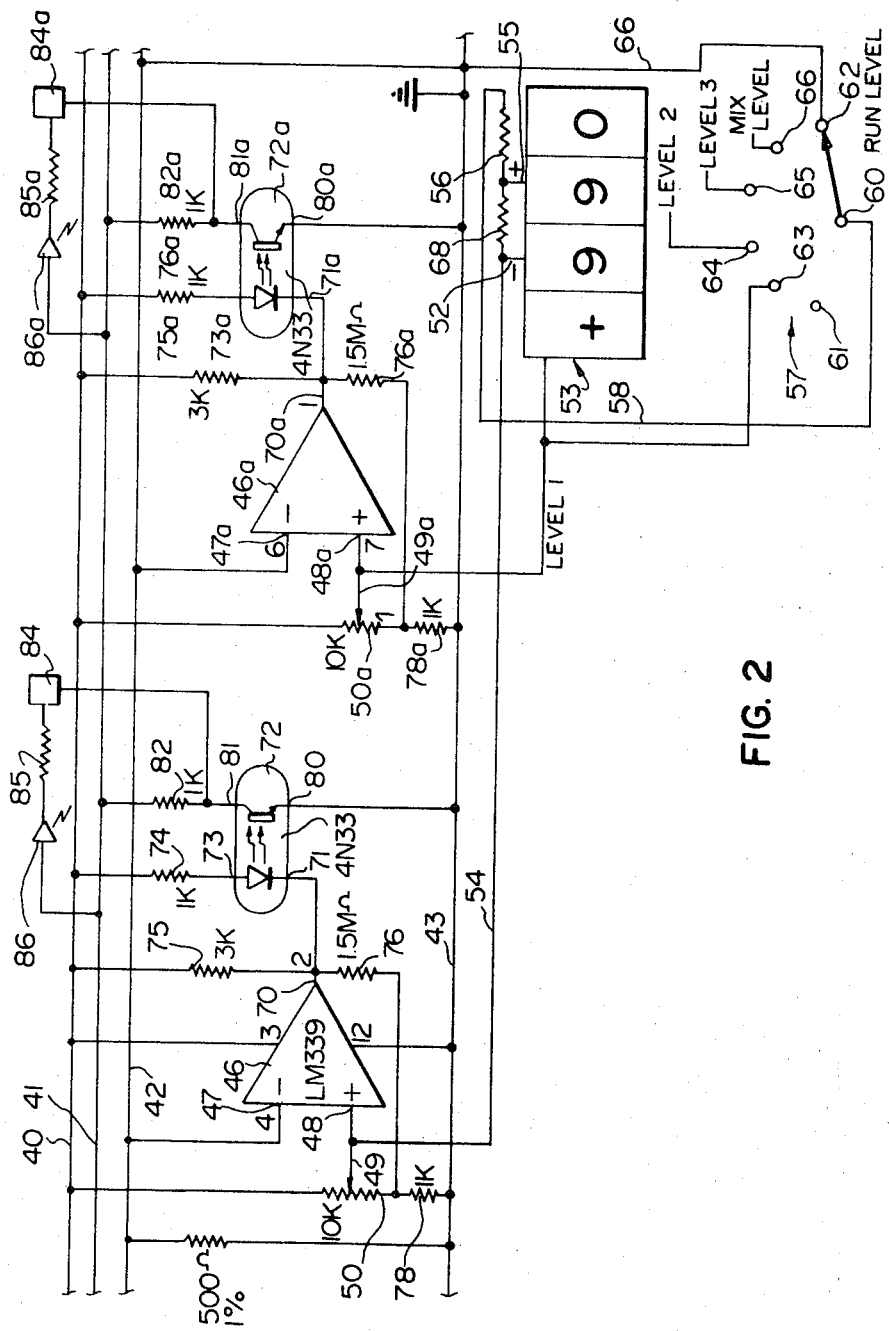
FIG. 2 is a block diagram of a portion of the controller and panel of FIG. 1.

Reference will now be made to FIG. 2 which shows the circuitry of part of controller 10 and panel 11. More particularly, the circuitry in controller 10 for establishing when zero level is reached and for setting level 1 and for establishing when level 1 is reached are disclosed in addition to a meter and selector switch of panel 11. The level setting circuitry is supplied by four buses, namely a 12 volt supply line 40, a 5 volt supply line 41, a signal line 42 which is connected to line 18 (see FIG. 1) from the ultrasonic sensor 21, and a circuit ground line 43.

An accurate resistor 45 typically having a value of 500±1%, is connected across lines 42 and 43. The signal appearing on line 18 from ultrasonic sensor 21 is a 4 to 20 mA signal which varies linearly from 4 mA when surface 23 is at the zero (empty) level to 20 mA when surface 23 is at level three (full). Thus, as this current flows through resistor 45 a voltage varying between 2 volts corresponding to zero level and 10 volts corresponding to level 3 is obtained.

A comparator 46 has an inverting input 47 connected to signal line 42 and thus a voltage of between 2 and 10 volts is applied to input 47. The non-inverting input 48 of comparator 46 is connected to a slider 49 of a potentiometer 50 which is connected between the 12 volt line 40 and ground line 43. Since comparator 46 is intended to detect an empty condition, zero level, slider 50 is adjusted manually to produce a 2 volt signal at input 48. This establishes the zero level for the tank.

Potentiometer slider 49 is also connected to the −ve terminal 52 of a digital voltmeter 53 via a line 54. The +ve terminal 55 is connected through a resistor 56 to a selector switch 57 by means of lead 58. More specifically, the connection is made to the rotary contact 60 of selector switch 57. Contact 60 is manually rotatable to at least 6 different positions at which it is engageable with respective stationary contacts 61–65. Contact 61 is the "off" contact which is simply a stop at which conduction through rotary contact 60 is interrupted. Contact 62 represents the "run" position of the switch and this contact is connected to signal line 42 through line 66. Contacts 63, 64 and 65, respectively, define level 1, level 2 and level 3 positions and contact 66 defines the mixer level position.

The voltage which is obtained between lines 54 and 42 supplying voltmeter 53 varies between 0 and 8 volts corresponding to empty and full, respectively. In order to obtain a "100" reading on voltmeter 53, for an input of 8 volts, a resistor 68 is inserted between terminals 52 and 55, and appropriate values of that resistor and resistor 56 are chosen. Typically, resistor 56 is selected as 1 MΩ and resistor 68 is 150 KΩ.

The output 70 of comparator 46 is connected to the negative input terminal 71 of an optoelectronic device 72, the positive input terminal 73 of which is connected through a 1 KΩ resistor 74 to line 40. Output 70 is also connected to the 12 volt line 40 through a 3 KΩ resistor 75 and through a 1.5 MΩ resistor 76 to the junction between potentiometer 50 and a 1 KΩ resistor 78 which has one end connected to ground line 43.

Outputs 80 and 81 of optoelectronic device 72 are connected respectively to ground line 43 and through 1

KΩ resistor 82 to 5 volt line 41. Output 81 is also connected to an indicating circuit comprising an output terminal 84, a resistor 85 and LED 86 the anode of which is connected to the 5 volt line 41. Terminal 84 also provides the control signal to the sequencing circuits described later.

A comparator 46a identical with comparator 46 is used to set level 1. As with comparator 46, this comparator has inputs 47a and 48a the former being connected to signal line 42 and the latter to the slider 49a of a potentiometer 50a connected across lines 40 and 43 as in a manner identical to potentiometer 50.

Slider 49a is also connected to contact 63 of switch 57. Resistors 74a, 75a, 76a, 78a and 85a are identical to and connected in the same manner as resistors 74, 75, 76, 78 and 85. An optoelectronic device 72a identical to device 72 is connected in the same way as device 72 to lines 40, 41 and 43. More particularly, input 71a is connected to output 70a of comparator 40a. Also, an L.E.D. 86a is provided for indicating when the appropriate level has been reached and an output terminal 84a is also provided.

It should be understood that for each of level 2, level 3 and the mixer level there is an individual comparator circuit identical to that described in relation to the zero level or level 1 and in each case the potentiometer slider is connected to the appropriate contact 64, 65 or 66 of switch 57.

In order to set any one of these levels at a required percentage of fill tank, the following procedure should be adopted. It is assumed that ultrasonic sensor 21 has already been set up, zero level potentiometer 50 has been adjusted and input resistors 50 and 68 have been selected to provide a 0-100 meter reading for 0-8 volt input. Selector contact 60 is switched to contact 03 and potentiometer slider 49a is adjusted manually using a screw driver until the reading on meter 53 reaches the desired percentage say 40%. Contact 60 is then switched to contact 64 and the associated potentiometer slider adjusted manually until the meter reading reaches the desired percentage for level 2 and so on for level 3 and the mixer level.

When the comparators of FIG. 2 have been set up as described above, contact 60 can be switched to the "RUN" contact 62 in which position the meter reading will rise from O as the tank 1 fills. As each level is reached in turn the output 70, 70a etc. of comparators 46, 46a etc. go from high (5 volts) to low (0 volts), thus triggering the relevant optoelectronic device 72 and completing the circuit through the respective LED 86 to illuminate the LED's 86 in turn.

Figure 3:
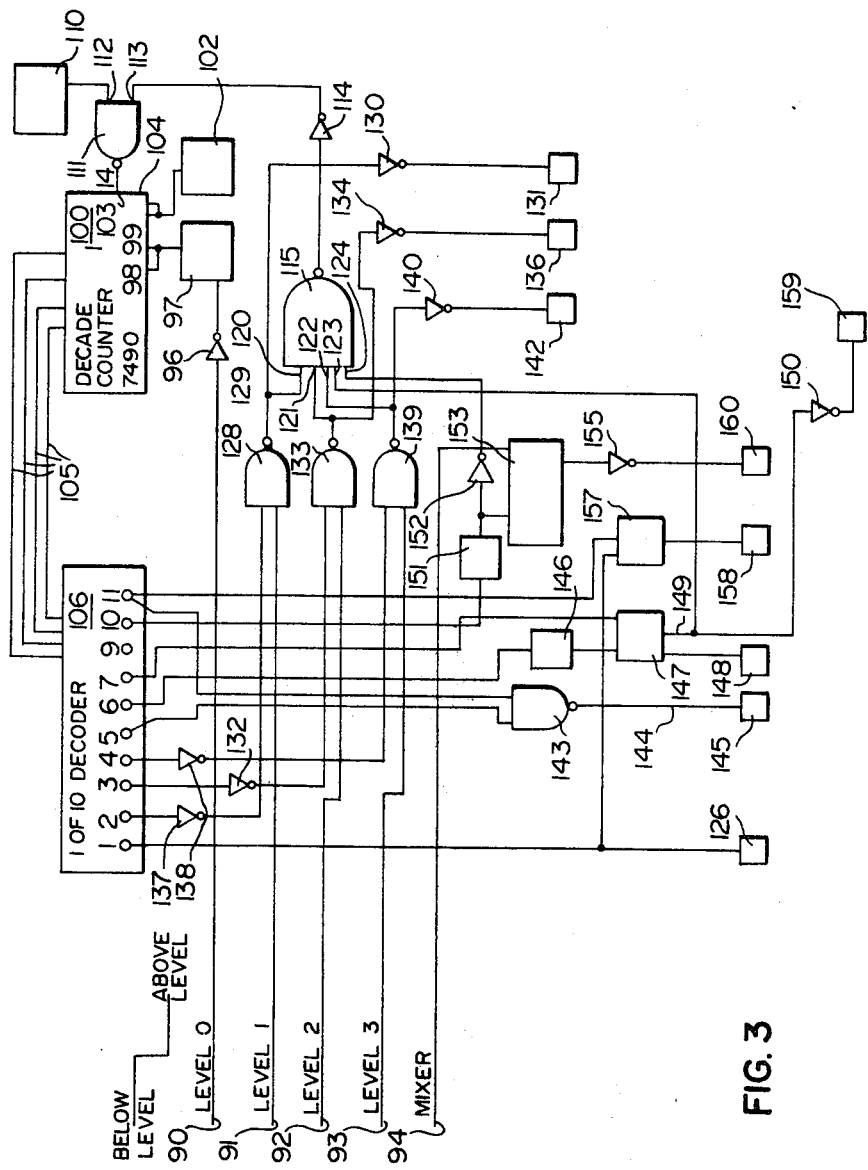
FIG. 3 is a block diagram showing the sequence circuitry of the controller of FIG. 1.

The actual sequency of the filling and mixing operations described generally in relation to FIG. 1 will now be described in greater detail with reference to FIG. 3 which shows the sequencing circuitry. Input lines 90-94 are connected respectively to the zero level comparator circuit, level 1 comparator circuit, level 2 comparator circuit, level 3 comparator circuit and mixer level comparator circuit, respectively described with reference to FIG. 2. Thus, the same signals which caused LED's 86 to turn on are applied to these lines 90-94. Specifically, line 90 is connected to output terminal 84 of FIG. 2, line 91 to terminal 84a etc.

The level zero line 90 is connected through an inverter 96 to a one shot 97 which is connected to reset inputs 98 and 99 of a decade counter 100. A power up one shot 102 is connected to set inputs 103 and 104 of decade counter 100, one shot 102 being energised when a power on switch (not shown) is activated manually. Operation of one shot 102 causes decade counter 100 to set a binary count of 9 on the four parallel binary output lines 105 and when one shot 97 is activated the decade counter 100 is reset to zero. Binary lines 105 are input to a 1 of 10 decoder 106 having terminals $D_1$ to $D_{11}$ which are normally high but which are respectively switched to an active low according to the binary number appearing on lines 105.

Decade counter 100 is stepped by means of a clock 110. However, a NAND gate 111 is interposed between clock 110 and counter 100, the clock being connected to one input 112 of the NAND gate. The other input 113 is connected through an inverter 114 to the output of a NAND gate 115 which has five inputs 120, 121, 122, 123 and 124. The connections to these inputs will become apparent from the following description.

Terminal $D_1$ of decoder 106 is connected to a slow fill alarm terminal 126 and this alarm will be described in greater detail below. Terminal $D_2$ is connected through an inverter 127 to one input of a NAND gate 128. The other input of NAND gate 128 is connected to line 91. The output 129 is connected through an inverter 130 to a terminal 131 which is connected to the solenoid (not shown) for operating water valve 5a. Output 129 is also connected to input 120 of NAND gate 115.

Terminal $D_3$ is connected through an inverter 132 to one input of a NAND gate 133 the other input of which is connected to line 92. The output of NAND gate 133 is connected to input 121 of NAND gate 115 and is also connected through an inverter 134 to terminal 136 which is connected to the solenoid (not shown) which operates silicate valve 5b.

Terminal $D_4$ is connected through an inverter 138 to an input of a NAND gate 139 the other input of which is connected to line 93. The output of NAND gate 139 is connected to input 122 and is also connected through an inverter 140 to terminal 142 is connected to the solenoid (not shown) which operates caustic valve 5c.

Terminals $D_5$ and $D_{11}$ of decoder 106 are connected to the inputs of a NAND gate 143 the output 144 of which is connected to the set pump counter terminal 145.

Terminal $D_6$ is connected to a one shot 146 which is connected to logic circuitry 147 which receives an input from end of count terminal 148. Terminal $D_7$ is also connected to logic circuitry 147. The output 149 is connected to input 123 of NAND gate 115 and also through an inverter 150 to terminal 159 which is connected to pump starter 15 (see FIG. 1).

Terminal $D_{10}$ is connected to mixer timer 151 the output of which is connected through an inverter 152 to input 124 of NAND gate 115. A mixer logic circuit 153 is also provided and this has an input 154 connected to the output of timer 151 and another input connected to mixer line 94. Circuit 153 has an output connected through an inverter 155 to terminal 160 which is connected to mixer starter 14 (see FIG. 1).

Terminal $D_{11}$ is connected to a logic circuit 157 the output of which is connected to the solenoid 158 for operating process valve 32. Terminal $D_1$ is also connected to logic circuit 157.

The sequencer of FIG. 3 operates as follows. When power is first applied to the controller, the power-up one shot 102 sets the counter 100 to a count of 9. Decoder 106 is then active low on output terminal $D_{11}$. Thus, process valve 32 is open due to output signal appearing at terminal 158 and so mix is being fed from tank 1 to the process. Mixer 12 is running unless surface 23 is below mixer level.

When tank 1 becomes empty the zero level comparator 46 switches from a low output at 70 to a high output causing LED 86 to go out. The low to high transition also causes one shot 97 to fire resetting counter 100 to zero.

This in turn produces an active low output at terminal $D_1$ of the decoder 106. The sudden switching from high to low on terminal $D_1$ of decoder 106 is used to reset the slow fill alarm 126 and to set logic latch 157 which closes the supply valve 32 and turns off the supply valve lamp (not shown). There is no signal at this point to inhibit clock pulses from reaching the counter. The result is that after about 150 microseconds a pulse from the clock 110 causes the counter 100 to advance to a count of one and the decoder 106 becomes active low on terminal 2. This low is converted to a high by inverter 137 causing a low to be obtained at output 129 of NAND gate 128. This low is converted by inverter 130 to a high which opens the water valve $5a$ via terminal 131. At the same time further clock pulses to the counter are inhibited by the low appearing at input 120 of NAND gate 115 until the level comparator switches from high to low. At this instant the signal on line 91 goes low, reversing the signal on NAND gate output 129. Thus the water valve closes and another clock pulse is permitted to advance the counter 100. The decoder 106 advances to active low on terminal 3; the clock pulse is again inhibited through gates 133, 115 and 111 and the silicate valve opens $5b$ because of the high generated at the output of inverter 134. The same procedure shuts off the silicate valve at level 2 and advances to the caustic valve open on terminal $D_4$ of the decoder.

When the caustic level 3 has been satisfied the decoder 106 advances to terminal $D_5$ and on the next clock pulse to terminal $D_6$. Terminal $D_5$ produces a pulse that is used in the pump control circuits to reset the counters. This is explained later. At terminal $D_6$ and $D_7$ on the decoder 106, the pump is latched in a run position by means of the logic circuits 146 and 147. The pump runs and continues until a signal returns to the pump logic indicating that the count is complete. This action stops the pump. Further details on the counter circuits will be described below.

As soon as the pump has stopped, the counter receives another pulse from the clock to move the decoder output to terminal $D_9$. This position is not used so the next clock pulse advances the decoder to $D_{10}$ where mixer 12 starts. The mixer timer 151 is also initiated and after 1½ minutes the inhibit low appearing at input 124 of NAND gate 124 goes high thus allowing the clock pulses to stop counter 100 and advance the decoder 106 to its final position $D_{11}$. In this position logic latch 157 is set and terminal 158 energised to open the process valve 32. There is no further change in the sequence counting until the tank has again become empty. The mixer will stop during the delivery cycle when its preset level is reached. This prevents churning the blade in air when the tank level is low.

As soon as the zero level comparator senses an empty tank (i.e. the level signal has dropped to 4 mA) the counter 150 is reset to zero by one shot 97 and the decoder 106 moves from position 11 to position 1. A new fill cycle commences.

The logic for pump control indicated in FIG. 3 as blocks 143, 145, 146, 147 and 148 will now be described in greater detail with reference to FIGS. 4 and 5.

After the three levels of liquid in the tank have been satisfied on the fill cycle, the decoder output (low) moves from pin $D_4$ to pin $D_5$. After one clock pulse it moves to pin $D_6$ and on the second clock pulse to pin $D_7$. Pin $D_7$ remains low until the pump delivery is complete.

Figure 4:
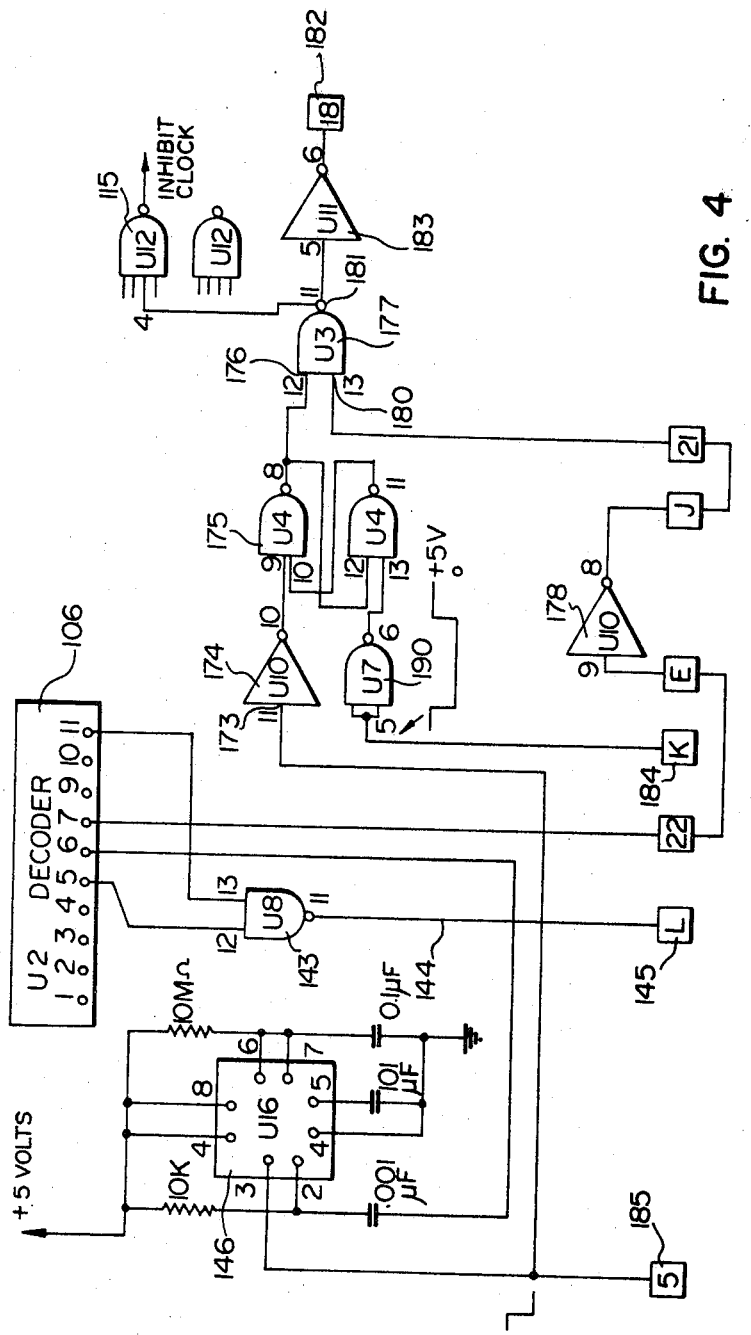
FIG. 4 is a block diagram showing in greater detail the pump logic circuitry which is shown broadly in FIG. 3.
Figure 5:
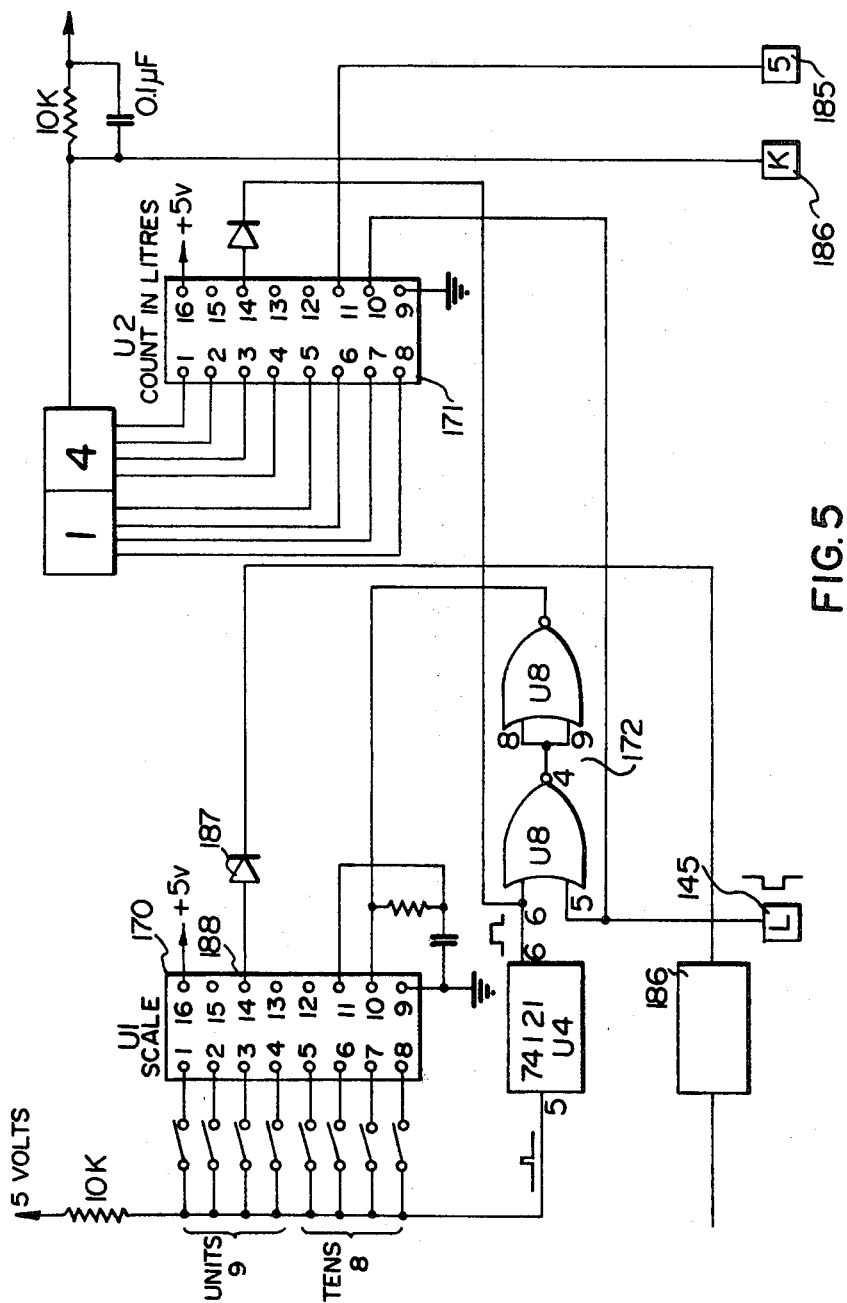
FIG. 5 is a block diagram showing counting circuits connected to the logic circuitry of FIG. 4.

Consider the actions that take place in FIGS. 4 and 5 while the decoder 106 output moves from $D_5$ and $D_7$. A positive pulse generated at output 144 of NAND gate 143 goes via terminal 145 to reset both the scaler counter 170 and the main counter 171 via latch 172.

With decoder 106 pin $D_6$ having a low (low), the pulse sustain one-shot 146 is triggered and produces a pulse of about 1 second duration at input 173 of inverter 174. This sets the pump latch 175 so that input 176 of NAND gate 177 is high.

The decoder 106 output, now on pin $D_7$, provides via inverter 178 a high to input 180 of gate 177. Output 181 goes low. Output terminal 182 goes high because of inverter 183 until the pump latch is reset by a pulse on terminal 184. As terminal 182 is connected to the pump starter relay the pump runs when a high is present on terminal 184.

Triggering of one shot 146 also produces a pulse at terminal 185 which is applied as a start pulse to counter 171.

The scaler counter 170 is programmed with 2 B.C.D. digits. FIG. 5 shows 89 for the program switch settings.

When the pump is running 4 pulses per revolution of the pump motor are generated by transducer 25 and these are passed through a pulse shaper 186 and diode 187 to counter input 188. As indicated above, counter 170 is reset to zero and put in the "count" mode by a pulse on terminal 145.

When 89 pulses have been counted, the counter 170 generates an output pulse which goes through a one shot 189 to the main counter 171. This pulse now represents one liter output from the pump. The scaler counter 170 resets and commences to count a further 89 input pulses.

When the main counter 171 registers the count that has been set up on the panel thumb switches (not shown) an output is generated on terminal 184 which resets the pump latch 175 via gate 190 and stops the pump. The decoder moves on to output $D_9$ (not used) and then to output $D_{10}$. The mixer starts.

Figure 6:
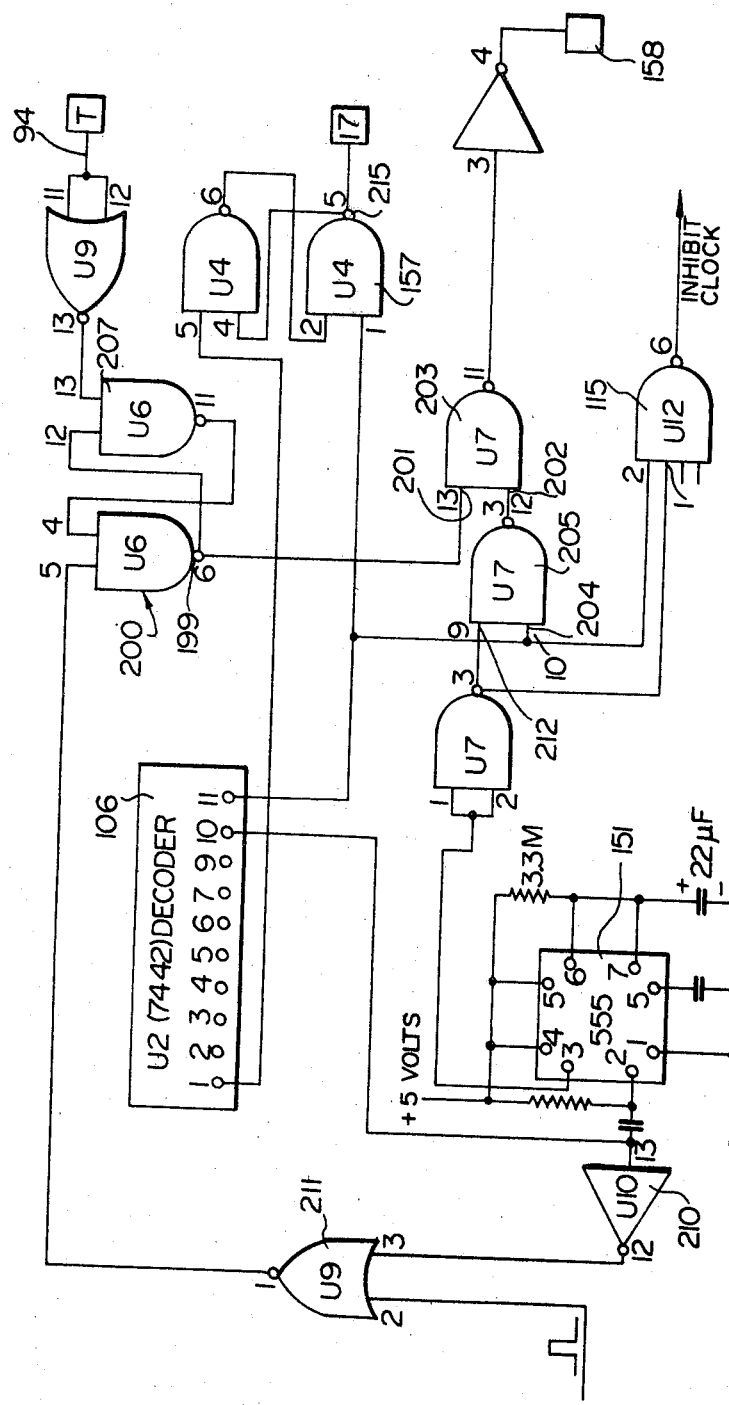
FIG. 6 is a block diagram showing in greater detail the mixer logic circuitry which is shown broadly in FIG. 3.

The details of the mixer logic circuitry described briefly above in relation FIG. 3 and identified as blocks 151, 152 and 155 will now be described with reference to FIG. 6.

When the controller is switched on the state of pin 199 on the mixer latch 200 depends on the input from the mixer comparator appearing on line 94. If pin 199 is high the mixer will run because both inputs 201 and 202 of NAND gate 203 will then be high and mixer relay 158 will be energised. Because pin $D_{11}$ of the decoder 106 goes low immediately on switching on this will cause input 204 on NAND gate 205 to be low. Hence input 202 will be high. The mixer will run until level drops below the mix comparator setting. The mixer latch 200 will then reset and the mixer stops.

During a fill cycle the mixer remains off until the output pin $D_{10}$ on the decoder 106 goes low. Since the level in the tank is now at the full state, input 207 of latch 200 will be high. Input 208 of latch 200 goes low via inverter 210 and NOR gate 211 when the decoder 106 is on output pin $D_{10}$. This output 199 is latched high.

This position of the decoder also initiates the mix timer one-shot 151. Input 212 of gate 205 goes low for the mix time. Thus input 202 goes high and the mixer runs.

After the mix time the decoder moves to output $D_{11}$. Pin 204 of gate 205 is now low although pin 212 has now gone high. Pin 202 remains high. The mixer continues to run and the supply valve latches 157 is set by the signal on $D_{11}$. The process valve 32 is opened by the high at output 215. The mixer latch changes state when the comparator switches at mixer level and the mixer stops.

Latch 157 is toggled when decoder 106 reverts to $D_1$ thus closing the supply valve.

Figure 7:
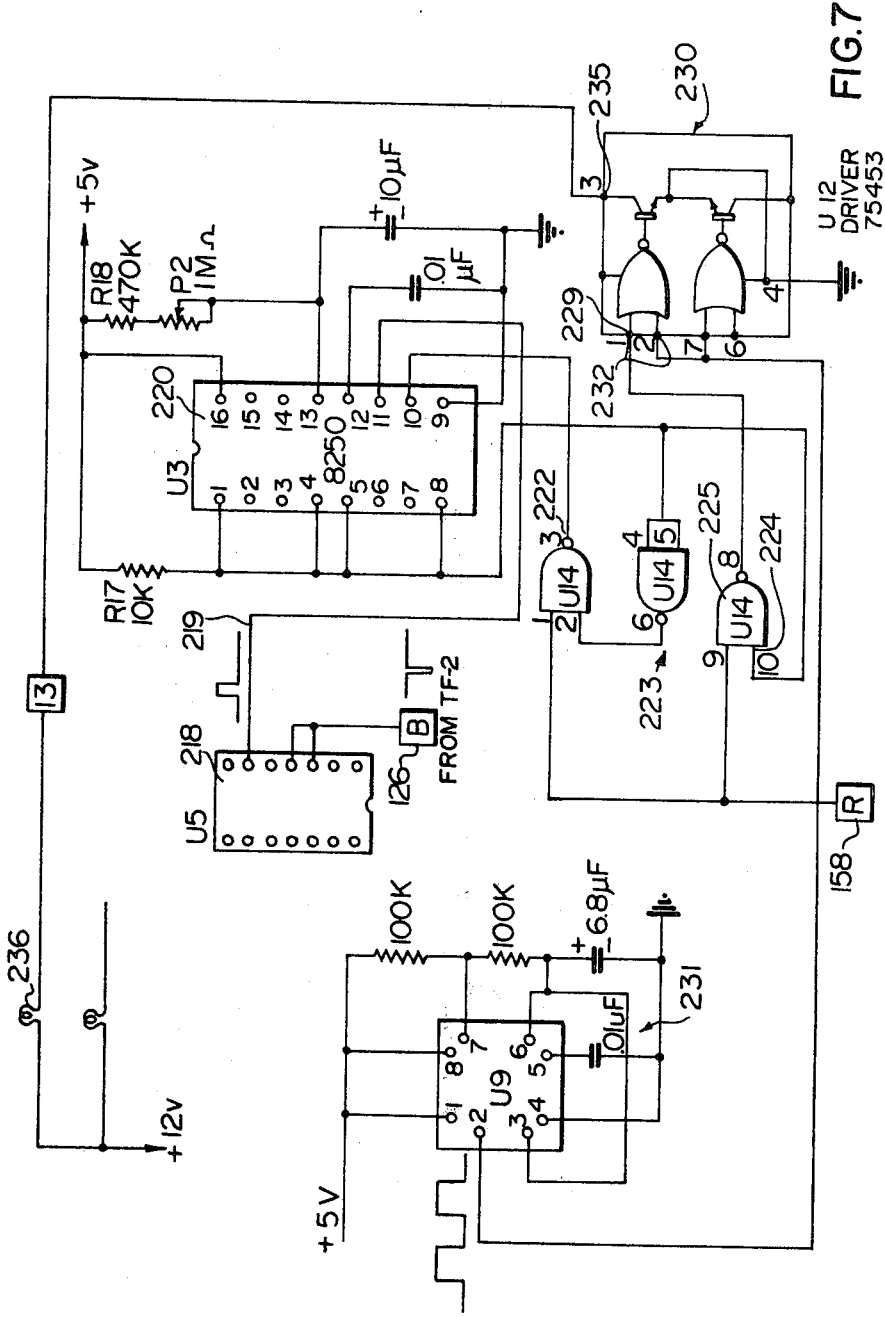
FIG. 7 is a block diagram showing the slow fill alarm circuitry.

The details of the slow fill alarm described briefly above will now be described with reference to FIG. 7.

A short negative going pulse is provided from pin $D_1$ of the decoder 106. This pulse goes to one shot 215 on 3 via terminal 126. The one-shot output one line 219 starts the counter 220 at the same time as the fill starts.

Counter 218 counts to 99 using internally generated clock pulses adjusted by potentiometer P2 to a suitable period. A period of 9 seconds would give total time $(9 \times 99)/60 = 14.85$ mins.

If the fill cycle completes before the end of the count, the counter 218 is reset by a low on 158 from pin $D_{11}$ and output 222 of latch 223 will go high.

If counter 220 completes the count before the end of the fill cycle, pin 224 of NAND gate 225 goes high, output 226 goes low. The input 229 of driver 230 is low. Flasher oscillator 231 oscillates continuously with square wave output of about 0.7 Hz. and is connected to pin 232 of driver 230. Driver output 235 is connected to slow fill flashing lamp 236.

Each time input 232 goes low and provided input 229 is low the driver turns on the slow fill lamp 236 which flashes at a frequency of about 0.7 Hz.

Figure 8:
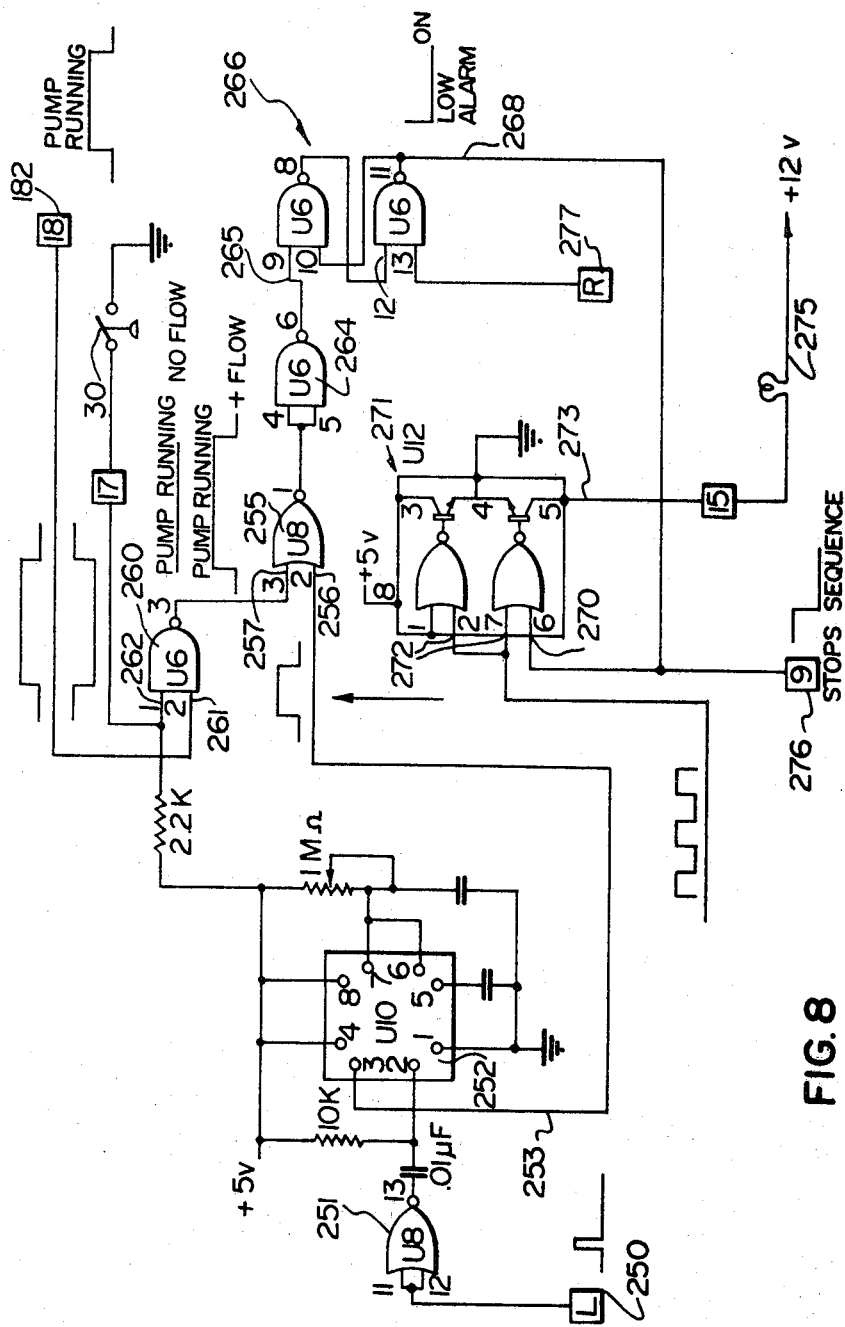
FIG. 8 is a block diagram showing the drum empty alarm circuitry.

The drum empty alarm will now be described with reference to FIG. 8.

Terminal $D_5$ of decoder 106 is connected to a terminal 250 forming the input of an inverter 251 so that when decoder 106 reaches $D_5$ one-shot 252 is triggered and feeds a high pulse via line 253 to an input 254 of a NOR gate 255. The other input 257 of NOR gate 255 is connected to the output of a NAND gate 260 one input 261 of which is connected to terminal 182 and the other input 262 of which is connected to flow switch 30 (also shown in FIG. 1). It will be remembered that terminal 182 as shown in FIG. 4 derives a signal to energise the pump starter and so when the pump is running a high is present at input 261 of NAND gate 260. Before flow switch 30 has time to operate a high is present at input 262 and so the output of NAND gate 260 is low. With a low at input 257 and a high at input 254 the output of NOR gate 255 is low. This is inverted by inverter 262 and the resulting high at input 265 of latch 266 maintains an unchanged high at output 268 of the latch.

One shot 252 is arranged to deliver its high pulse shortly before the presence of a high on terminal 182 and to maintain the pulse for a predetermined duration during which, if the pump is operating normally and there is sufficient Kalex Penta the flow switch 30 should close. If it does close during this period, the output of NAND gate 260 will go high leaving the output of NOR gate 255 unchanged.

If the flow switch 30 does not close input 257 of NOR gate 255 remains low and when input 254 reverts to a low after the predetermined duration of the one-shot pulse, a high is obtained at the output of NOR gate 255 which when inverted causes latch 266 to toggle to output a low pulse to input 270 of driver 271. A pulse train obtained from a continuously running flasher oscillator (not shown) is fed to inputs 272 of driver 271 which derives at its output 273 a 5 volt pulse train which causes lamp 275 to flash thus indicating an alarm condition. The presence of a low at output 268 of latch 266 is also used via terminal 276 to stop the process. Latch 266 may be manually reset via terminal 277.

The solution of sodium hydroxide, sodium silicate, Kalex Penta and water which can be obtained by the system described above used as a stabilizing solution in a bleaching process the control of which will be described with reference to FIG. 9.

During the continuous bleaching of cloth either in open width or rope form, it is usual for wet cloth from a wash section to pass through a saturator in order to pick up chemicals required for the bleaching process. Typical running speeds for the cloth would be 100 to 200 meters per minute. The holding capacity of the saturator ensures a brief dwell time in the bath. Since the cloth is already wet upon entry, a mutual exchange takes place between the solution in the bath and the moisture in the cloth. The bath is diluted and the cloth solution is enriched by chemicals in the bath. A satisfactory transfer takes place by maintaining the bath at known concentrations. The chemicals in the bath typically include a bleach chemical (usually hydrogen peroxide) and the stabilizing solution.

Since the purpose of the saturator operation is to ensure a proper transfer of chemicals to the cloth and since the amount of chemical needed bears a direct relation to the weight of the cloth being bleached, it is desirable to provide an automatic means of controlling the addition of chemicals to the bath in relation to the weight of the cloth being processed and to enable the saturation of the cloth to be calibrated in terms of percent of cloth weight for each of the two basic chemical feeds used.

The logic of this approach may be reasoned as follows.

Assume cloth to be running through a saturator at a rate of 100 meters per minute and that the cloth weight is represented as 5.0 meters per kilogram. Then 50 meters of cloth weighs 10 kg and requires $\frac{1}{2}$ minute running time. 1% of 10 Kg is 100 grams. If 50% hydrogen peroxide is the bleaching chemical, a volume of 167 c.c. of this hydrogen peroxide represents 1% of the 10 Kg cloth weight. If while this cloth continues to run at 100 meters/min. a steady flow of 167 c.c. per half minute is maintained, this adds 1% of cloth weight to the bath (of 100% hydrogen peroxide) on a continuous basis. If we assume as a starting point that the bath is not capable of transferring to the cloth at the 1% rate because it is too low in concentration then the feed rate is in excess of the transfer rate and the bath grows stronger. At the point that equilibrium is reached in the bath the rate of feed is equal to the rate of transfer and 1% of cloth weight, in hydrogen peroxide, is being transferred to the cloth. The same sort of reasoning applies if the bath is initially too rich. It will transfer at a rate faster than the feed rate until equilibrium is reached. This suggests that instead of attempting to hold a saturator at a known equilibrium concentration in order to get a known transfer it would be as feasible and more exact to make the feed rate equal to the quantity required on the cloth and let the equilibrium point find its own level.

Figure 9:
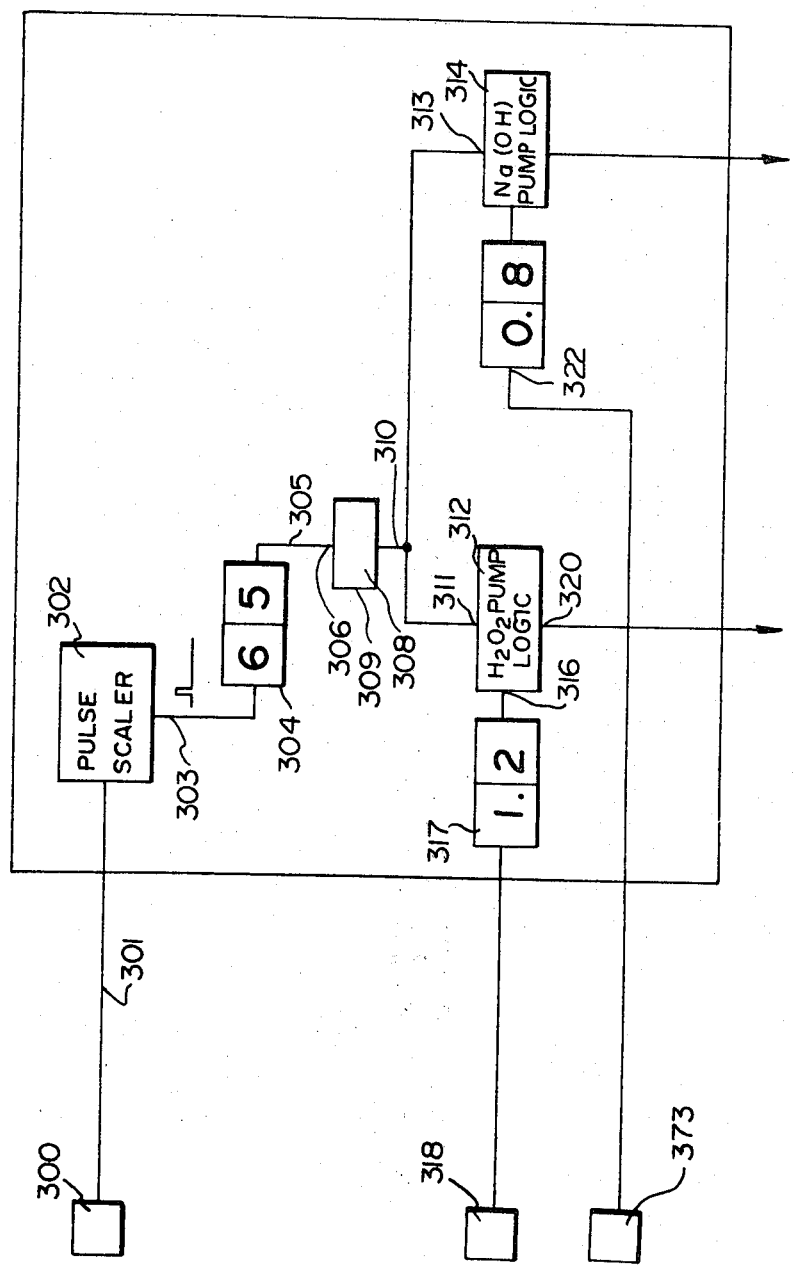
FIG. 9 is a schematic of a bleach controller which is capable of using the mix prepared by the system shown in FIG. 1.

The controller of FIG. 9 takes the above described approach. A pulse input from a cloth drive motor 300 is passed along line 301 to pulse scaler 302 which counts and scales down to a pulse output of 1 pulse/meter of cloth. The scaler output 303 is connected to a two decade counter 304 which can be preset by thumbswitches to set up the number of meters of the particular cloth to make up 10 Kg. At the output 305 of counter 304 is derived a pulse for every 10 Kg of cloth passed through the saturator. Output 305 is connected to the input 306 of a blend select control 308 which is a pulse scaler which may be adjusted manually to various settings 309 representing the percentage cotton in the cloth so that at output 310 is derived 1 pulse every $10 \times (100/p)$ Kg where P is the percentage cotton.

The rationale behind the use of the blend select is that it is more meaningful to relate chemical feed rate to weight of cotton rather than total cloth weight in the case of blend fabrics because the polyester or other synthetic material in the blend exhibits negligible pick up of bleach solution.

Output 310 is connected to input 311 of $H_2O_2$ pump logic 312 and also to input 313 of a stabilizer solution pump logic 314. Logic 312 has another input 316 which is connected to the output of a two decade counter 317 which is clocked by a clock 318. The output 320 is connected to a metering pump starter for the $H_2O_2$. The stroke of the metering pump is set according to the strength of the $H_2O_2$ available. For a 50% $H_2O_2$ solution the stroke is set at 16.7 cc because 167 cc of that solution contains 100 gms $H_2O_2$ which is 1% of 10 Kg. This means that the count set in counter 317 represents in tenths the percentage $H_2O_2$ related to cloth weight (or more particularly cotton weight). Accordingly, by providing thumb switches on counter 317 any desired percentage $H_2O_2$ to cloth weight can be selected.

Pump logic 314 also is associated with a manually variable two decoder counter 322 fed by a clock 323 and has an output 324 connected to a metering pump starter for the stabilizer solution. Again if the gms./liter of Na(OH) in the stabilizer solution is known the stroke of the meter pump can be adjusted so that the counter 322 reads in tenths percentage of Na(OH) per cloth weight as desired.

In operation pump logics 312 and 314 each receive a pulse for every 10 Kg of cloth or, in the case of a blend, for every $10 \times (100/p)$ Kg of cloth. Simultaneously counters 317 and 322 are receiving clock pulses from clocks 318 and 323, respectively. As soon as the pump logics receive a pulse at input 311 or 313 as the case may be their respective metering pumps begin. When counter 317 counts the preset number of clock pulses a pulse obtained at input 316 of logic 312 stops the pump from metering out any more $H_2O_2$.

Similarly the setting on counter 322 determines when the stabilizer solution pump stops.

What is claimed is:

1. Apparatus for providing a mix of two or more liquids in predetermined volumetric proportions comprising a mixing tank, supply lines leading to the mixing tank from respective sources of the two or more liquids, valve means on each supply line for controlling the flow of the respective liquid, an ultrasonic level sensor positioned above the tank for monitoring the level of liquid in the tank, control means supplied by electrical signals from the ultrasonic sensor which electrical signals have a variable parameter indicative of the level of liquid in the tank, means in the control means for setting two or more desired levels corresponding respectively to the desired volumetric proportions and for comparing the level monitored by the ultrasonic sensor with the set levels to obtain control signals and means responsive to the control signals to open and close each valve in sequence to obtain the desired mix.

2. Apparatus according to claim 1, including a metering pump connected to a source of a further liquid and to the tank for metering out small quantities of the further liquid to the tank, transducer means monitoring the pump rotation and applying corresponding signals to the control means, means in the control means for setting a desired volume of the third liquid and for comparing the actual volume delivered by the pump as measured by the transducer, and means for stopping the pump when the desired volume of the third liquid has been measured, the control means being arranged to commence the metering of the further liquid only after the completion of dispensing of the two or more liquids into the tank.

3. Apparatus according to claim 2, including mixing means in the tank, the control means being arranged to run the mixing means only after dispensing of all the liquids into the tank and only when the level of liquid in the tank as monitored by the ultrasonic sensor is above a predetermined level as set in the control means.

4. Apparatus according to claim 3, including a supply line leading from the mixing tank to a process stage and valve means on the supply line, the control means being arranged to open the valve means after completion of mixing of the liquids in the tank and to close the valve means when a predetermined low level is reached.

5. Apparatus according to any of claims 1 to 4, including means for setting in the control means a total fill cycle time and means for comparing with the set time the actual fill cycle time, and means for operating a slow fill alarm if the actual fill cycle time exceeds the set time.

6. Apparatus according to claims 2, 3 or 4, including a flow switch measuring the flow of the further liquid from the metering pump and means in the control means to operate an alarm if after a predetermined time set into the control means the measured flow is below a predetermined value.

7. Apparatus for controlling the flow of at least one chemical to a cloth saturator bath through which cloth to be processed is continuously passed comprising means for measuring the speed of the cloth and for thereby deriving signals representative of the speed of the cloth, circuit means for selectively entering a value corresponding to the density of the cloth and for thereby weighting these signals according to the density of the cloth whereby signals corresponding to the weight of cloth per minute are obtained, means responsive to the last mentioned signals to pump into the saturator bath a quantity of said at least one chemical whereby the quantity of said at least one chemical pumped to the saturator bath corresponds to the measured weight of cloth per minute.

8. Apparatus according to claim 7, wherein said circuit means is manually settable.

9. Apparatus according to claim 8, including further circuit means for selectively entering a value corresponding to the proportion of a particular component in the cloth, said further circuit means operating on the signals corresponding to the weight of cloth per minute to derive signals corresponding to the weight of the particular component per minute.

10. Apparatus according to claim 9, wherein the particular component is cotton.

11. Apparatus according to claim 10, wherein the further circuit means is manually settable in terms of the percentage of cotton in the cloth.

12. Apparatus according to claim 4, wherein said process stage includes a saturator bath through which cloth to be processed is continuously passed and further comprising means for measuring the speed of the cloth and for thereby deriving signals representative of the speed of the cloth, circuit means for selectively entering a value corresponding to the density of the cloth and for thereby weighting these signals according to the density of the cloth whereby signals corresponding to the weight of cloth per minute are obtained, means responsive to the last mentioned signals to pump into the saturator bath a quantity of said mix from said mixing tank whereby the quantity of said mix from said mixing tank pumped to the saturator bath corresponds to the measured weight of cloth per minute.

13. Apparatus for providing a mix of two or more liquids in predetermined volumetric proportions comprising a mixing tank, supply lines leading to the mixing tank from respective sources of the two or more liquids, valve means on each supply line for controlling the flow of the respective liquid, a single level sensor positioned above the tank for monitoring the level of liquid in the tank, control means supplied by electrical signals from the level sensor which electrical signals have a variable parameter indicative of the level of liquid in the tank, means in the control means for setting two or more desired levels corresponding respectively to the desired volumetric proportions and for comparing the level monitored by the level sensor with the set levels to obtain control signals and means responsive to the control signals to open and close each valve in sequence to obtain the desired mix.

14. Apparatus according to claim 13 including a metering pump connected to a source of a further liquid and to the tank for metering out small quantities of the further liquid to the tank, transducer means for monitoring the pump rotation and for applying corresponding signals to the control means, means in the control means for setting a desired volume of the third liquid and for comparing the actual volume delivered by the pump as measured by the transducer, and means for stopping the pump when the desired volume of the third liquid has been measured, the control means being arranged to commence the metering of the further liquid only after the completion of dispensing of the two or more liquids into the tank.

15. Apparatus according to claim 14, including mixing means in the tank, the control means being arranged to run the mixing means only after dispensing of all the liquids into the tank and only when the level of liquid in the tank as monitored by the level sensor is above a predetermined level as set in the control means.

16. Apparatus according to claim 15, including a supply line leading from the mixing tank to a process stage and valve means on the supply line, the control means being arranged to open the valve means after completion of mixing of the liquids in the tank and to close the valve means when a predetermined low level is reached.

17. Apparatus according to any of claims 13 to 16, including means for setting in the control means a total fill cycle time and means for comparing with the set time the actual fill cycle time, and means for operating a slow fill alarm if the actual fill cycle time exceeds the set time.

18. Apparatus according to claims 14, 15 or 16, including a flow switch for measuring the flow of the further liquid from the metering pump and means in the control means to operate an alarm if after a predetermined time set into the control means the measured flow is below a predetermined value.

19. Apparatus according to claim 13, further comprising a process stage includes a saturator bath through which cloth to be processed is continuously passed and further comprising means for measuring the speed of the cloth and for thereby deriving signals representative of the speed of the cloth, circuit means for selectively entering a value corresponding to the density of the cloth and for thereby weighting these signals according to the density of the cloth whereby signals corresponding to the weight of cloth per minute are obtained, means responsive to the last mentioned signals to pump into the saturator bath a quantity of said mix from said mixing tank whereby the quantity of said mix from said mixing tank pumped to the saturator bath corresponds to the measured weight of cloth per minute.

20. Apparatus according to claim 19, wherein said circuit means is manually settable.

21. Apparatus according to claim 20, including further circuit means for selectively entering a value corresponding to the proportion of a particular component in the cloth, said further circuit means operating on the signals corresponding to the weight of cloth per minute to derive signals corresponding to the weight of the particular component per minute.

22. Apparatus according to claim 21, wherein the particular component is cotton.

23. Apparatus according to claim 22, wherein the further circuit means is manually settable in terms of the percentage of cotton in the cloth.

24. In a continuous cloth bleaching system in which cloth from a wash section is passed through a saturator to pick up a chemical for bleaching the cloth, apparatus for controlling the flow of the chemical to the saturator comprising means for measuring the speed of the cloth and for thereby deriving signals representative of the speed of the cloth, circuit means for selectively entering a value corresponding to the density of the cloth and for thereby weighting these signals according to the density of the cloth whereby signals corresponding to the weight of cloth per minute are obtained, means responsive to the last mentioned signals to pump into the saturator bath a quantity of said at least one chemical whereby the quantity of said at least one chemical pumped to the saturator bath corresponds to the measured weight of cloth per minute.

25. Apparatus according to claim 24, wherein said circuit means is manually settable.

26. Apparatus according to claim 25, including further circuit means for selectively entering a value corresponding to the proportion of a particular component in the cloth, said further circuit means operating on the signals corresponding to the weight of cloth per minute to derive signals corresponding to the weight of the particular component per minute.

27. Apparatus according to claim 26, wherein the particular component is cotton.

28. Apparatus according to claim 27, wherein the further circuit means is manually settable in terms of the percentage of cotton in the cloth.

* * * * *